(12) United States Patent
Wei et al.

(10) Patent No.: US 10,667,233 B2
(45) Date of Patent: May 26, 2020

(54) LOCATION TRACKING

(71) Applicant: Huawei Technologies Co., Ltd., Shenzhen, Guangdong (CN)

(72) Inventors: Qing Wei, Munich (DE); Fenqin Zhu, Shanghai (CN); Chenghui Peng, Munich (DE); Riccardo Trivisonno, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/283,383

(22) Filed: Feb. 22, 2019

(65) Prior Publication Data

US 2019/0191406 A1 Jun. 20, 2019

Related U.S. Application Data

(63) Continuation of application No. PCT/EP2016/069897, filed on Aug. 23, 2016.

(51) Int. Cl.
*H04W 64/00* (2009.01)
*G01S 5/02* (2010.01)
*G01S 5/00* (2006.01)

(52) U.S. Cl.
CPC ........... *H04W 64/00* (2013.01); *G01S 5/0027* (2013.01); *G01S 5/0205* (2013.01); *G01S 5/0263* (2013.01)

(58) Field of Classification Search
CPC .... H04W 64/00; G01S 5/0205; G01S 5/0263; G01S 5/0027
See application file for complete search history.

(56) References Cited

U.S. PATENT DOCUMENTS

| | | | |
|---|---|---|---|
| 2014/0248901 A1* | 9/2014 | Johnsson | H04W 64/00 455/456.1 |
| 2016/0029173 A1* | 1/2016 | Edge | H04W 4/02 455/456.2 |
| 2016/0157253 A1* | 6/2016 | Yamine | H04W 4/90 455/456.2 |

FOREIGN PATENT DOCUMENTS

| | | |
|---|---|---|
| CN | 1638521 A | 7/2005 |
| CN | 101083830 A | 12/2007 |
| CN | 101415171 A | 4/2009 |
| WO | 98/37721 A2 | 8/1998 |
| WO | 99/31917 A2 | 6/1999 |

(Continued)

OTHER PUBLICATIONS

"3rd Generation Partnership Project; Technical Specification Group Services and System Aspects; Study on Architecture for Next Generation System (Release 14)", 3GPP TR 23.799 V0.7.0 (Aug. 2016), 323 pages.

(Continued)

*Primary Examiner* — Wayne H Cai
(74) *Attorney, Agent, or Firm* — Leydig, Voit & Mayer, Ltd.

(57) ABSTRACT

A communications system comprising a core network, a radio access network and at least one user equipment device, wherein: the core network is configured for communicating with the user equipment device to form a first estimate of the location of the user equipment device; the radio access network is configured for communicating with the user equipment device to form a second estimate of the location of the user equipment device; and the core network is configured for forming a third estimate of the location of the user equipment device by synthesizing the first and second estimates.

7 Claims, 6 Drawing Sheets

(56) References Cited

FOREIGN PATENT DOCUMENTS

| WO | 2004066658 A1 | 8/2004 |
|---|---|---|
| WO | 2015/192884 A1 | 12/2015 |

OTHER PUBLICATIONS

Bart Barton, "Tracking Area Update (TAU) procedure", Apr. 29, 2012, 10 pages.

Huawei, HiSilicon, "Solution: Location tracking in NextGen system", SA WG2 Meeting #116, Jul. 11-15, 2016, Vienna, Austria, 3 pages, S2-163997 (revision of S2-16xxxx).

Huawei, HiSilicon, "UE mobility tracking in "active state" and in "power saving" state", 3GPP TSG-RAN2 Meeting #94 Nanjing, China, May 23-27, 2016, 6 pages, R2-164129.

"3rd Generation Partnership Project; Technical Specification Group Services and System Aspects; Feasibility Study on New Services and Markets Technology Enablers; Stage 1 (Release 14)", 3GPP TR 22.891 V14.1.0 (Jun. 2016); 95 pages.

"3rd Generation Partnership Project; Technical Specification Group Core Network and Terminals; Non-Access-Stratum (NAS) protocol for Evolved Packet System (EPS); Stage 3 (Release 14)", 3GPP TS 24.301 V14.0.1 (Jun. 2016); 452 pages.

"3rd Generation Partnership Project; Technical Specification Group Services and System Aspects; General Packet Radio Service (GPRS) enhancements for Evolved Universal Terrestrial Radio Access Network (E-UTRAN) access Release 13)", 3GPP TS 23.401 V13.6.1 (Mar. 2016), 365 pages.

"3rd Generation Partnership Project; Technical Specification Group Services and System Aspects; General Packet Radio Service (GPRS) enhancements for Evolved Universal Terrestrial Radio Access Network (E-UTRAN) access Release 14)", 3GPP TS 23.401 V14.0.0 (Jun. 2016), 374 pages.

"3rd Generation Partnership Project; Technical Specification Group Services and System Aspects; Study on Architecture for Next Generation System (Release 14)", 3GPP TR 23.799 V0.5.0 (May 2016), 178 pages.

"3rd Generation Partnership Project; Technical Specification Group Radio Access Network; Evolved Universal Terrestrial Radio Access Network (E-UTRAN); S1 Application Protocol (S1AP)(Release 13)", 3GPP TS 36.413 V13.3.1 (Jun. 2016), 331 pages.

Huawei, HiSilicon, "Solution: Location tracking in NextGen system", SA WG2 Meeting #116, Jul. 11-15, 2016, Vienna, Austria, 3 pages, S2-163545 (revision of S2-16xxxx).

\* cited by examiner

LOCATION TRACKING

CROSS-REFERENCE TO RELATED APPLICATIONS

This application is a continuation of International Application No. PCT/EP2016/069897, filed on Aug. 23, 2016, the disclosure of which is hereby incorporated by reference in its entirety.

TECHNICAL FIELD

The present application relates to tracking the locations of devices. The devices may be mobile communication terminals. The tracking may be performed using a communication network.

BACKGROUND

Existing communication networks such as 4G networks allow the locations of user equipment devices to be tracked. The locations can, for example, be tracked by a core network communicating with a device or with a base station to request the location of a device. In future networks it is planned that network infrastructures (radio access networks (RANs)) of multiple protocols (e.g. 3G, 4G, Wi-Fi) will cooperate to allow a device to communicate using any of those protocols. In a hybrid network of this type some the underlying network protocols may have different or limited support for location tracking. It is therefore not straightforward to track locations across multiple protocols in such a future network.

In existing mobile networks, communication devices or user equipment (UE) entities can move around without setting up an active connection to the network. This is advantageous in that it saves energy and radio resources. Existing mobile networks such as 4G networks can track the location of UEs when they are in that state. That state is commonly referred to as the IDLE state. One reason for this is to allow the network to estimate by which base station(s) or access point(s) the UE can be reached in case a need arises to signal it or send data to it.

Figure 1:
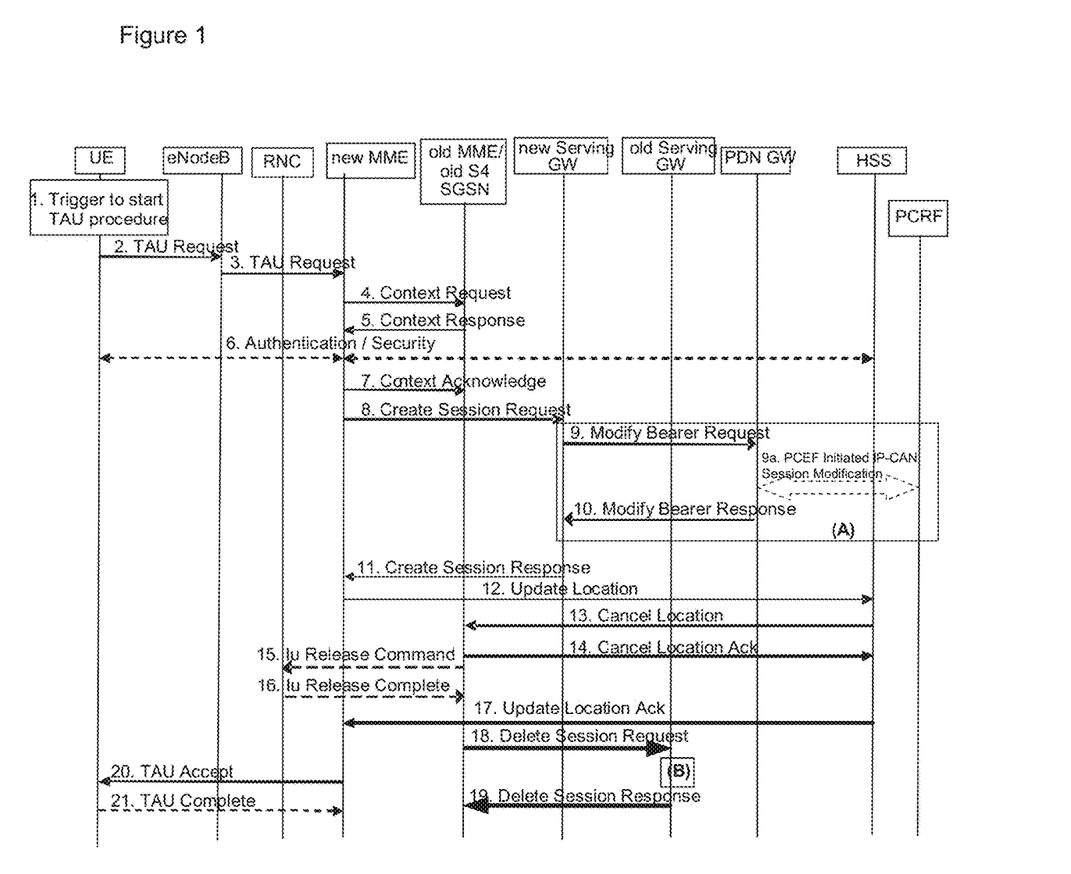
FIG. 1 shows a prior art location tracking signaling scheme.

In the current 4G system, the location of a UE that is in the IDLE state is tracked in the core network (CN) using the location registration (LR)/location update (LU) procedure. This may for example involve the TAU procedure defined in "3GPP TS 24.301 V14.0.1 Non-Access-Stratum (NAS) protocol for Evolved Packet System (EPS); Stage 3" and "3GPP TS 23.401 v14.0.1 GPRS enhancement for E-UTRAN access". This may be termed a form of CN-level location tracking. Specifically, the LR/LU operation is performed by a NAS between a UE and a mobility management entity (MME). This procedure is illustrated in FIG. 1.

For each LU operation, the UE needs to establish a communication channel to the CN. This includes the RRC procedure to setup a radio bearer to carry the LU (e.g. by TAU) signaling from the UE to the eNB, and the S1AP procedure to carry LU signaling associated with the UE from the eNB to the MME. It should be noted that the setting up of radio bearers can consume more radio resources and UE energy than other radio signaling such as beacons.

In current 4G networks the TAU is triggered by CN-level tracking policies. This may, for example happen when a UE crosses the boundary of a tracking area (TA), or when a previous location update times out. At that point the tracking area ID (TAI) is broadcast by the RAN. The UE checks the received TAI against a TAI list it previously received from the MME. If the received TAI is not in its TAI list, it sends a TAU to the MME.

In some non-3GPP RANs or RATs, for instance Wi-Fi, LT tracking and TAs are not supported.

R2-164129: "UE mobility tracking in 'active state' and in 'power saving' state" proposes a general framework for CN/RAN collaboration on location tracking. In this proposal location tracking functionality is split into RAN location tracking and CN location tracking. A RAN anchor is defined to act as the mobility anchor of a UE in the data plane. The CN LT function is responsible for performing UE location tracking at the CN level, performing policy based location tracking management and tracking/inquiring of UE RAN anchor and RAN LT changes. Once the RAN anchor is known, the CN can deliver downlink traffic for the UE to that anchor point. Then the RAN can deliver downlink traffic from the RAN anchor to the UE. The RAN LT function is responsible for performing UE location tracking in the RAN level according to the policy set by the core network LT function and reporting changes of UE RAN anchor or changes of RAN LT to the CN LT function according the policy set by the CN LT function.

As indicated above, future systems are expected to support multiple RANs. In these systems different RANs are expected to support different systems for indicating and detecting locations. According to "3GPP TR 22.891 Study on New Services and Markets Technology Enablers", the indication of a UE's location when it is being tracked may be the ID of the base station serving the UE, the IDs of a group of base stations any of which is serving the UE, the MAC address of a Wi-Fi access point (AP), etc. The location of the UE could be detected directly in the RAN using a downlink (DL) measurement report or using an uplink reference signal from the UE as described in "WO2015/192884".

Another factor is that in future networks it is expected that a considerably increased number of UEs will be connected due to an increased diversity of device types such as wearables and sensors.

In a future system it would be preferred for location tracking to be enabled for all RANs and/or radio access technologies (RATs) that are supported by the system. Location tracking should preferably be supported across different RANs and RATs. In addition, it would be preferred for the role of UE (i.e. the amount of signaling from the UE and the amount of processing performed at the UE) in order to support location tracking to be reduced, even compared to the current 4G system. This would save power at the UEs. In addition, it would be preferred for the amount of signaling in the RAN and the core network (CN) in order to perform and support UE location tracking to be reduced compared to the current 4G system.

For various reasons, the current 4G mobile telecommunication system is not able to satisfy these needs. Some reasons for that are:

1. The mechanism for location tracking in the current 4G system only provides location tracking for the 4G access network. It does not support integration with other RATs for location tracking. Whilst RAN-level tracking has been discussed (see R2-164129: "UE mobility tracking in 'active state' and in 'power saving' state") it has not been determined how such a function could be supported at the core network: for example, how the CN could make use of RAN-level location tracking; (i.e. get the location tracking results from the RAN), how the CN could influence RAN-level location tracking, or how location tracking at the RAN level and at the CN level can be aligned.

2. In current 4G networks the UE always needs to use the NAS procedure (i.e. the TAU procedure described in "3GPP TS 24.301 V14.0.1 Non-Access-Stratum (NAS) protocol for Evolved Packet System (EPS); Stage 3") to report its location to the CN. This means the UE needs to set up a communication channel to the CN to report on its location. Doing so consumes energy at the UE and occupies radio resources.

3. Because location reporting is performed on a per-UE basis, the amount of control signaling needed to do location updating is broadly proportional to the number of UEs. In future networks it is envisaged that there may be device densities of up to 2500 UEs/km$^2$. This would require a great amount of control signaling. Also, if there are many UEs moving in a similar pattern (e.g. connected vehicles) they could even overload the control plane by sending location update simultaneously.

There is a need for a way of performing location updates in a communications network which supports better integration of multiple RATs and/or allows the amount of signaling to be kept down.

SUMMARY OF THE DISCLOSURE

According to one system there is provided a communications system comprising a core network, a radio access network and at least one user equipment device, wherein: the core network is configured for communicating with the user equipment device to form a first estimate of the location of the user equipment device; the radio access network is configured for communicating with the user equipment device to form a second estimate of the location of the user equipment device; and the core network is configured for forming a third estimate of the location of the user equipment device by synthesizing the first and second estimates. A system of this type can allow for efficient performing of location updates and/or backwards compatibility with existing networks.

The core network and the radio access network may be configured for concurrently communicating with the user equipment device to form the first and second estimates. They may perform such communication simultaneously or consecutively during a time window. They may perform such communication without scheduling such communication between each other. Concurrent forming of location estimates in this way can allow for efficient estimation of the location of the user equipment device.

The core network may be configured for communicating with the user equipment device via the radio access network to form the first estimate. In such a system the radio access network can serve as a radio access network subordinate to the core network. The policy of the radio access network for estimating the location of the user equipment device can be set by the core network. When the core network and the radio access network are integrated in any of these ways the signaling between them can be efficient.

The core network may be configured to form the first estimate of the location of the user equipment device by a process comprising: transmitting to the user equipment device a request for it to report its location; and receiving from the user equipment device a report of its location. This avoids the need for the core network itself to be able to estimate the location directly.

The radio access network may be configured to form the second estimate of the location of the user equipment device by means of measurements of the physical layer properties of radio signals passing between the user equipment device and the radio access network. Those properties may, for example, be received signal strength, signal delay, direction (e.g., as indicated by a directional antenna of the radio access network) and/or error rate. Estimating the location in this way can allow the radio access network's estimate of location to be determined independently of the core network's estimate.

The radio access network may be configured for communicating with the user equipment device to form the second estimate of the location of the user equipment device without there being a communication channel established between the user equipment device and the radio access network. In this way radio resources can be saved.

The core network may be configured for communicating with the user equipment device to form the first estimate of the location of the user equipment device by means of a communication channel established between the user equipment device and the radio access network. In this way the core network can reliably receive traffic data relating to location from the user equipment.

A method for tracking the location of a user equipment device in a communications system comprising a core network and a radio access network may comprise the following steps: the core network communicating with the user equipment device to form a first estimate of the location of the user equipment device, the radio access network communicating with the user equipment device to form a second estimate of the location of the user equipment device; and the core network forming a third estimate of the location of the user equipment device by synthesizing the first and second estimates. Properties of this method may be analogous to those of the system set out above.

According to another system there is provided a core network, a radio access network and at least one user equipment device, the network comprising a location management function configured for selecting a mode of location tracking for the user equipment from among two or more of the following modes: a first mode in which the location of the user equipment device is tracked concurrently by both the core network and the radio access network communicating with the user equipment device; a second mode in which at any one time the location of the user equipment device is tracked by only a selected one of the core network and the radio access network communicating with the user equipment device; and a third mode in which the location of the user equipment device is tracked by the core network communicating with the user equipment device via the radio access network.

The radio access network may be configured to, on connecting to the core network, transmit to the core network an indication of its ability to implement one or both of the first and second modes. This may assist the core network in deciding which mode the system should adopt.

The radio access network may be responsive to a request from the core network to transmit to the core network an indication of its ability to implement one or both of the first and second modes. This may assist the core network in deciding which mode the system should adopt.

The radio access network may be configured to, in response to a change of a predetermined type in its capability, transmit to the core network an indication of its ability to implement one or both of the first and second modes. This may assist the core network in deciding which mode the system should adopt.

The core network may be configured to, when the system is operating in one or both of the first mode and the third mode, track the location of the user equipment by a process comprising: transmitting to the user equipment device a request for it to report its location; and receiving from the user equipment device a report of its location. This mode may provide compatibility with existing systems, such as 4G systems.

The radio access network may be configured to, when the system is operating in one or both of the first mode and the second mode, track the location of the user equipment by means of measurements of the physical layer properties of radio signals passing between the user equipment device and the radio access network. Those properties may, for example, be received signal strength, signal delay, direction (e.g., as indicated by a directional antenna of the radio access network) and/or error rate. Estimating the location in this way can allow the radio access network's estimate of location to be determined independently of the core network's estimate.

The radio access network may be configured to, when the system is operating in one or both of the first and second modes: form an estimate of the location of the user equipment device; and transmit that estimate to the core network. This can allow the core network to make use of the estimate, optionally by combining it with its own estimate of the location of the user equipment to form an enhanced estimate of the location of the user equipment.

The location management function may be configured to, when the system is operating in the second mode, select which of the core network and the radio access network is to track the location of the user equipment device. It may then signal the radio access network to track or not track the location of the user equipment device as appropriate.

The location management function may be configured to perform the said selection in dependence on one or more of: the location of the user equipment device, the physical type of the user equipment device, the usage type of the user equipment device, a coverage area of the radio access network, a capability of the radio access network and an estimated mobility of the user equipment device. Criteria of this type can allow the system to adopt an efficient means of position estimation.

The core network may comprise the location management function. This allows the core network to control which locationing mode is used.

Another communications system comprises a core network, a radio access network and at least one user equipment device, the network comprising a location management function configured for implementing a mode of location tracking for the user equipment in which at any one time the location of the user equipment device is tracked by only a selected one of the core network and the radio access network communicating with the user equipment device by selecting which of the core network and the radio access network is to communicate with the user equipment device for tracking the location thereof in dependence on a characteristic of the user equipment device.

The location management function may be configured to perform the said selection in dependence on one or more of: the location of the user equipment device, the physical type of the user equipment device, the usage type of the user equipment device and the mobility of the user equipment device. This can help an efficient mode to be adopted.

Another communication system comprises a core network, a radio access network and at least one user equipment device, the network comprising a location management function configured for implementing a mode of location tracking for the user equipment in which at any one time the location of the user equipment device is tracked by only a selected one of the core network and the radio access network communicating with the user equipment device by transmitting an instruction to at least one of the core network and the radio access network to cause it to communicate with the user equipment device for tracking the location thereof in dependence on a characteristic of the user equipment device.

The system may use the location data determined as above for deciding how to communicate with the user equipment device when the user equipment device does not have an active connection to the network. For example, the system may store for a user equipment device the latest location determined in the manner described above. Then when a need arises to communicate with the user equipment device, and the user equipment device does not have an active connection to the network, the system (e.g. the core network) may determine how to establish communication with the user equipment device in dependence on the latest determined location.

The core network may be compatible with a 4G cellular network. The core network may be a 5G network.

The radio access network may be a cellular or a non-cellular network. The radio access network may be a Wi-Fi (IEEE 802.11) network. The radio access network may operate in or exclusively in the ISM band. The core network may control radio access networks that operate outside the ISM band.

The core network may control radio access networks that operate geographically outside the scope of the said radio access network. The geographical scope of the said radio access network may be entirely within a single tracking area of the core network, or may correspond to the scope of a single tracking area of the core network, or may overlap multiple tracking areas of the core network.

As further aspects, core networks, radio access networks and user equipment devices according to the communication systems or method are provided.

BRIEF DESCRIPTION OF THE DRAWINGS

The present disclosure will now be described by way of example with reference to the accompanying drawings. In the drawings.

DETAILED DESCRIPTION OF EMBODIMENTS

In general terms, the systems to be described below can perform location tracking of UE devices using any of three modes of operation or tracking policies. Those modes are:
1. RAN assisted-parallel ("RANPLT"),
2. RAN assisted-complemented ("RANCLT"), and
3. CN independent ("CNLT").

The functions to support location tracking are divided into two parts.
1. The CN performs location tracking that is independent of the UE's means of access to the network. This is CN-level location tracking. The CN also manages the interoperation between the CN and the RAN and decides on a tracking policy for a particular UE, RAN or general location.
2. The RAN performs RAN-level location tracking. That is location tracking performed at the RAN. A location determined by location tracking at the RAN level may be reported to the CN.

Figure 2:
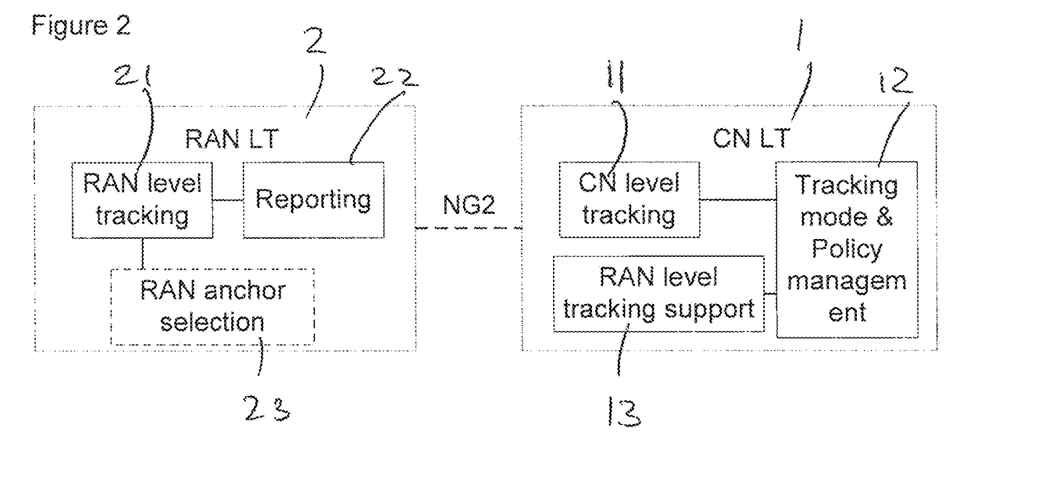
FIG. 2 shows schematically the functions that can be provided in the core network 1 and the radio access network 2 to support location tracking.

FIG. 2 shows schematically the functions that can be provided in the core network 1 and the radio access network 2 to support location tracking. These functions are shown as separate blocks in FIG. 2 for ease of explanation, but they could be implemented in any suitable way using hardware and/or software. Any one or more of the blocks of the CN or the RAN could be combined in an architectural sense.

As illustrated in FIG. 2, the CN LT function has three sub components. These are:

A CN-level tracking module 11. Broadly, the function of this is to perform CN-level UE location tracking. An example of this is NAS-based LR/LU.

A tracking mode and policy management module 12. Broadly, the functions of this are to decide on the mode in which the RAN and the CN should collaborate to perform location tracking and to manage policy-based location tracking management. Examples of tasks that may be encompassed by that management function include UE-based tracking area management, triggering or stopping RAN-level tracking, setting a RAN-level tracking policy for a UE or a RAN, setting a reporting mechanism to be performed to report the tracked location of a UE to the CN and setting a location update policy for a UE. In addition, this module can determine which settings for of a RAN-level or CN-level tracking policy should be adopted. Examples of such settings for a RAN-level tracking policy can include any one or more of the following: the frequency with which the RAN is to report the location of a UE to the CN, location accuracy required in the report of a UE location from the RAN to the CN, the format of the report of a UE location from the RAN to the CN, the allowed latency until downlink data is delivered to the UE and an indication of a RAN tracking area where RAN level tracking should be performed. Examples of such settings for a CN-level tracking policy include the defining of triggers for location updates—those may be analogous to the equivalent triggers in the current 4G system (e.g., a time-out value and a tracking area identifier (TAI) list), an indication of a RAN tracking area (which will be discussed further below) and the imposition of a stop or resume signal for the LU procedure from a UE.

A RAN-level tracking support module 13. Broadly the functions of this are (i) to monitor changes in the RAN anchor or access network (AN) for a UE, and to monitor changes in the state of location tracking by a RAN LT procedure and (ii) to process UE location reports from received from a RAN LT procedure. The step of processing the UE location report may include combining the information from RAN-level tracking and CN-level tracking and potentially de-aggregating the UE location from a location report from a RAN LT procedure.

The RAN LT function 2 has also three sub components illustrated in FIG. 2. Those are:

A RAN level tracking module 21. Broadly, the function of this is to perform RAN-level tracking of the location of UE devices according to a policy set by the CN LT policy function 12. This module may be considered to be an AN/RAN LT anchor. It may coordinate and share information relating to the location of a UE with one or more neighboring RAN LTs. The implementation of this module will depend on the type of the RAN.

A reporting module 22. Broadly, the function of this is to report changes of UE RAN anchor and changes of RAN LT to the CN LT tracking function 11. It may additionally report the location of a UE in the RAN to the CN LT function. It may inform the CN LT function 1 of the tracking capabilities of the RAN. The CN may then use that information to assist it to decide on a location tracking policy for that RAN or for specific UEs in that RAN. It may also aggregate location related information for UEs in the RAN.

A RAN anchor selection module 23. This function, if present, can be used to decide on a UE RAN anchor for performing RAN-level tracking. This allows the system to perform RAN-level tracking without the RAN anchor and the RAN LT being co-located. Even if this module is not present, the RAN LT can get the identity of a RAN anchor to use from another function in the network.

As indicated above, the system of FIG. 2 supports both RAN-level location tracking and CN-level location tracking. It has three modes of operation, referred to as RANPLT, RANCLT and CNLT. These will now be discussed in more detail.

RAN Assisted-Parallel Location Tracking (RANPLT)

In this mode, both the RAN and the CN take active part in tracking the location of a UE.

The RAN performs RAN-level tracking by estimating the location of the UE using a network-based locationing method implemented by the RAN. Examples of such a method are making measurements of signal strength and timing of uplink and/or downlink signals between the RAN and the UE so as to estimate the location of the UE. Another example is that if the UE is within range of a particular access point of the RAN, the UE may be taken to be within a predetermined distance of that access point or within a predetermined area about that access point. To perform RAN-level tracking the RAN can estimate the location of the UE without inquiring the location from the UE. The signals on which the RAN makes measurements so as to estimate the location may be signals that are not dedicated for estimating the location of a UE. Having estimated the location of a UE the RAN reports the results to the CN.

During the same window of time as the RAN is performing RAN-level tracking CN performs CN-level tracking. That CN-level tracking may for example be performing a NAS-based location update. Thus the CN may communicate with the UE to request the UE to estimate its own location, and the UE may report that location to the CN. The UE may estimate its location by any suitable method.

The actual estimation of the UE's location by the RAN and the CN may be performed simultaneously or at different times.

When the UE's location has been estimated by the RAN, and the result of that reported to the CN, and also by the CN, the CN has two sets of location data for the same UE. The CN can then combine those to get a combined location estimate for the UE. This can allow the CN to obtain a more reliable estimate of the UE's location than would be given by just one set of measurements.

In this mode, the CN manages the tracking policy both for RAN level tracking and CN level tracking. As indicated above, the policy may encompass factors such as frequency of updates and precision of location reports.

RAN-Assisted Complemented Location Tracking (RAN-CLT)

In this mode the location tracking can be performed by either the RAN or the CN at any one time. The system can switch between these approaches depending on the state of the network and/or of the UE. When the CN determines that it is appropriate for the RAN to perform RAN-level tracking that is done, and when the CN determines that it is appropriate for the CN to perform CN-level tracking that is done. An example of a situation where the CN may determine that RAN-level tracking is appropriate is when the UE is determined to have low mobility and/or is expected to remain within the limits of one RAN. An example of a situation where the CN may determine that CN-level tracking is appropriate is when the UE is determined to have high mobility and/or is not expected to remain within the limits of one RAN, or where the UE is associated with a RAN that does not support RAN-level tracking. When RAN-level tracking is no longer appropriate, CN-level tracking is resumed and RAN-level tracking is stopped: and vice versa.

In this mode, the CN manages the tracking policy both for RAN level tracking and CN level tracking. As indicated above, the policy may encompass factors such as frequency of updates and precision of location reports.

The CN LT function 1 can start and stop RAN-level UE tracking independently in different RANs and/or for different UEs. Some examples of reasons for this include whether it is applicable according to the capabilities of the RAN and the UE in question, and whether it is determined to be appropriate for the anticipated mobility and/or requirements of the UE.

CN independent Location Tracking (CNLT)

In this mode only the CN performs location tracking. The CN manages the policy for CN level tracking. This mode is analogous to the NAS based LR/LU currently proposed in EPC.

Figure 3:
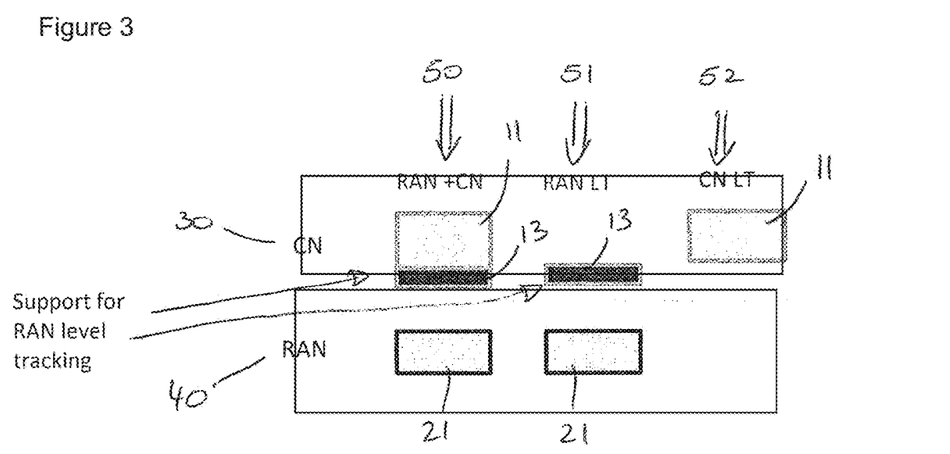
FIG. 3 shows the distribution of support functions for various types of location tracking.

FIG. 3 shows the distribution of support functions for various types of location tracking between the three modes described above. FIG. 3 shows a CN 30 and a RAN 40. For the RANPLT mode 50 the CN has functionality 11 to support performing CN-level location tracking and functionality 13 to support receiving data on RAN-level location tracking; and the RAN has functionality 21 to support performing RAN-level location tracking. For the RANCLT mode the RAN can perform RAN-level location tracking as indicated at 51 and at other times the CN can perform CN-level location tracking as indicated at 52. For the CNLT mode the CN simply needs to support CN-level location tracking as indicated at 52.

The signaling procedures to implement the modes described above will now be described.

FIGS. 4 to 10 indicate preferred sequential numbering for messages and actions, which are in the range starting from 1, and reference numerals used in the description below, which are above 100.

Figure 4:
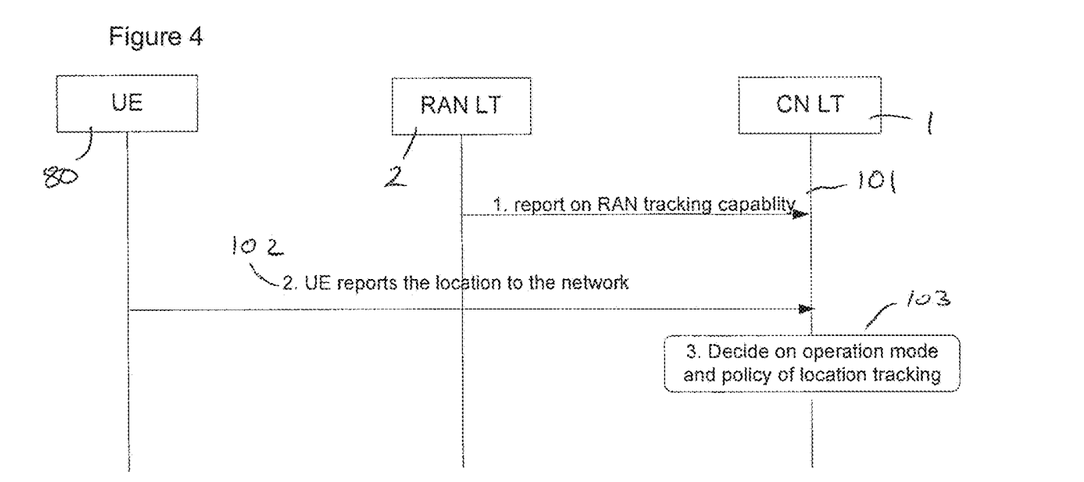
FIG. 4 shows signaling to enable a CN to decide on an operating mode.

FIG. 4 shows signaling to enable a CN to decide on an operating mode.

At step 101 a RAN LT 2 reports the location tracking capabilities of its RAN (e.g. tracking area and tracking accuracy) to a CN LT 1. This may happen automatically when a RAN is connected to a CN. It may happen periodically. It may happen when the location tracking capability of the RAN changes. The report 101 of RAN location tracking capability can include an indication of the identity of the RAN LT 2 (the RAN LT ID), an indication of the tracking area of the RAN, e.g. the geographic area in which the RAN is accessible to UEs, the accuracy with which the RAN can estimate and/or report UE locations and the frequency with which the RAN can estimate and/or report UE locations. The CN LT 1 stores an indication of the tracking capability of the RAN LT for use in step 103.

At step 102 a UE 80 reports its location to the CN. The report passes via the RAN to which the UE is connected. The report is received at the CN LT 1 of the CN. This step may take place when the UE first registers to the network or when it is triggered by another means to send a location update to the network. The message at 102 may be termed a location registration (LR) message. The LR message includes an indication of the identity of the UE (UE ID) and the identity of the RAN LT of the RAN to which the UE is connected. The identity of the RAN LT may be added by the RAN LT 2 to the message at 102.

At step 103, in response to receiving a message 102 from a UE 80 indicating the ID of a particular RAN LT that is serving that UE, the CN LT 1 retrieves the stored RAN tracking capability previously reported by that RAN LT at step 101. The CN LT also derives the profile of the UE 80 based on the UE ID reported by the UE in step 102. The UE profile may relate to attributes such as the UE's usage type, mobility pattern, device type and so on. In dependence on one or more of (i) the CN LT's own location tracking capability, (ii) the location tracking capability of the respective RAN and (iii) the UE's profile, the CN LT 1 decides on the location tracking method and related tracking policy to be adopted for that UE. As an example, if a UE is expected to move fast and/or if the tracking area of the respective RAN LT is limited in geographical scope, the CN LT may select the CNLT mode. The CN LT can also decide on a tracking policy in dependence on similar inputs.

Figure 5:
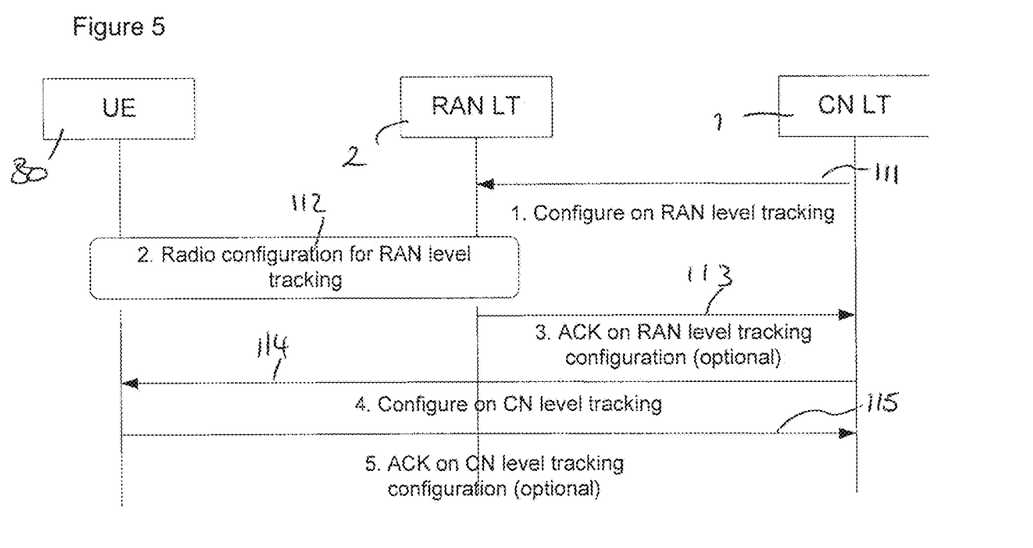
FIG. 5 shows signaling to configure location tracking.

FIG. 5 shows signaling to configure location tracking in a given area.

Once the CN LT has decided on the location tracking method and tracking policy, it configures the relevant entities to implement the selected location tracking method. It sends a configuration message 111 to the RAN LT 2 and a configuration message 114 to the UE. In response to message 111 the RAN LT 2 performs the appropriate radio configuration (step 112) in accordance with the tracking policy indicated in step 111 by the CN LT. The RAN LT and the UE adopt the indicated configuration. One or both of the RAN LT 2 and the UE 80 may acknowledge the configuration. (Steps 113 and 115).

The RAN-level tracking configuration message 111 may include indications of the RAN level tracking policy and the signal to be used to start or stop RAN level tracking. The CN-level tracking configuration message 114 may include indication of the settings for CN-level tracking and the signal to be used to start or stop CN-level tracking.

The consequences of signals 111 and 114 depend on the tracking mode selected by the CN in step 103. In some cases, there is no need to send both signals 111 and 114, and so they and the respective consequent steps 112, 113 and 115 may be omitted accordingly. In the case of RANPLT mode, step 111 triggers RAN-level tracking and sets the RAN-level tracking policy, and step 114 triggers CN-level tracking and sets CN-level tracking settings. In RANPLT both RAN-level and CN-level tracking are used concurrently so signals 111 and 114 are both sent. In the case of RANCLT mode, one of steps 111 and 114 is used to trigger the corresponding LT operation and set the corresponding LT policy, and the other one is used to stop the corresponding LT operation. When RANCLT mode is operating with RAN-level tracking signal 111 sets up and initiates RAN-level tracking and signal 114 signals the UE 80 to stop CN-level tracking. When RAN-CLT mode is operating with CN-level tracking signal 114 sets up and initiates CN-level tracking and signal 111 signals the RAN LT 2 to stop RAN-level tracking. In the case of CNLT mode, only steps 114 and 115 need be performed.

Figure 6:
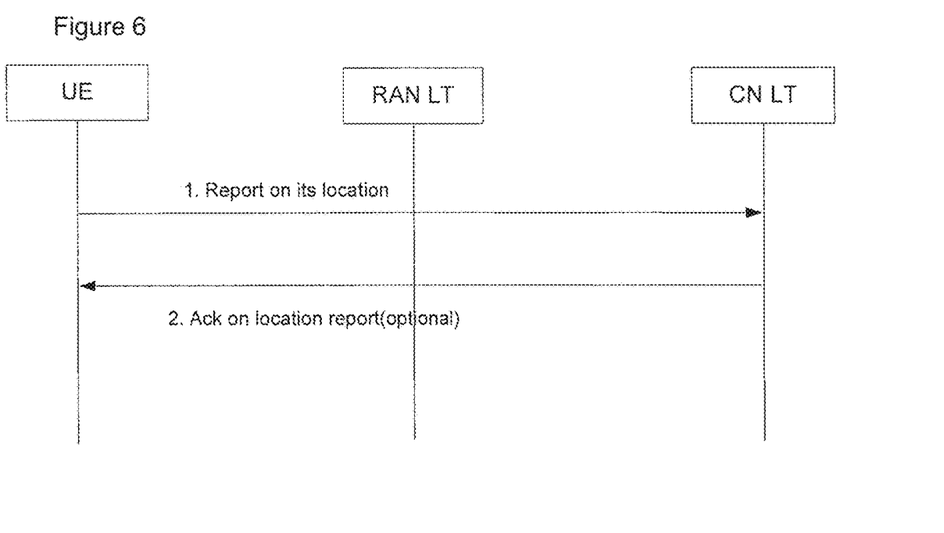
FIG. 6 shows signaling to report on location in a CNLT mode.

FIG. 6 shows signaling to report on location in the CNLT mode. This is similar to the mechanism in the current 4G system.

In RANPLT and RANCLT modes, the RAN LT performs RAN-level tracking and reports the results of that tracking to the CN LT. The report procedure can be both push-based (see FIG. 7) or pull-based (see FIG. 8).

Figure 7:
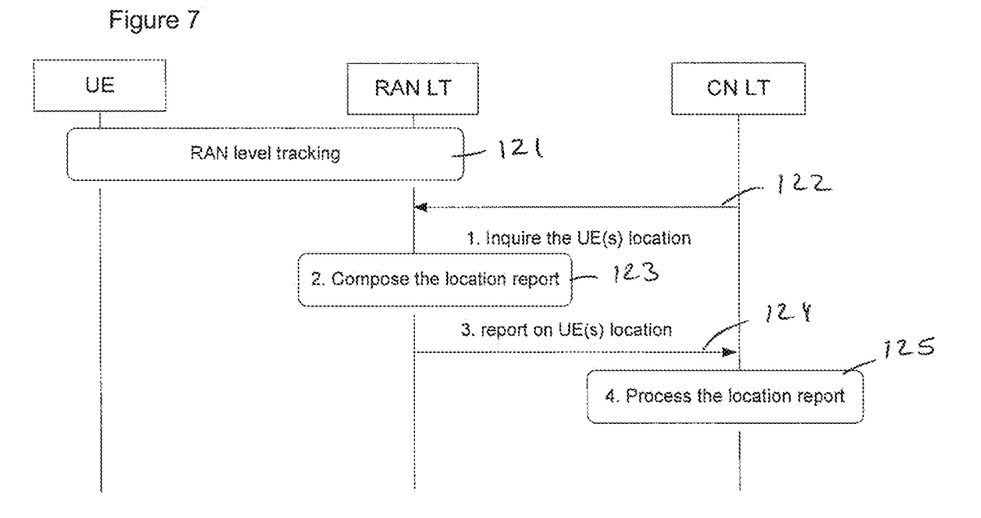
FIG. 7 shows a mechanism for performing pull-based location reporting.

FIG. 7 shows the mechanism for performing pull-based location reporting. At step 121 the RAN LT is performing RAN-level tracking. At step 122 the CN LT makes a pull request for the UE's location. At step 123 the RAN LT composes the appropriate location report. The location report can include the ID of the UE, the ID of the RAN anchor, the ID of the RAN LT and the ID of the respective AN. The location report includes an indication of the location of the UE and optionally other location-related parameters such as an indication of precision, time of measurement and so on. The location report may include the locations of multiple UEs, in which case multiple IDs can be sent in it. This will be described in more detail below. At step 124 the report is sent to the CN LT. Then the CN LT processes the location report. (Step 125). This may involve combining it with CN level tracking results in the RANPLT mode.

Figure 8:
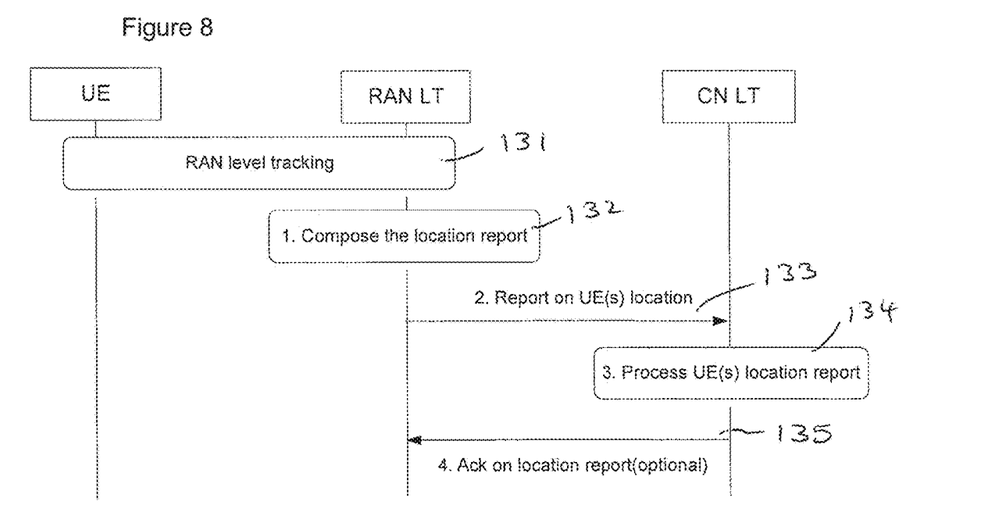
FIG. 8 shows a mechanism for performing push-based location reporting.

FIG. 8 shows the mechanism for push-based reporting. In this mode the steps 131 to 134 are analogous to steps 121, 123, 124, 125 of FIG. 7. An acknowledgement of the location report 135 can be sent from the CN to the RAN. This message can efficiently be used both as an acknowledgement and to transport the configuration of RAN-level tracking from the CN LT to the RAN LT.

Figure 9:
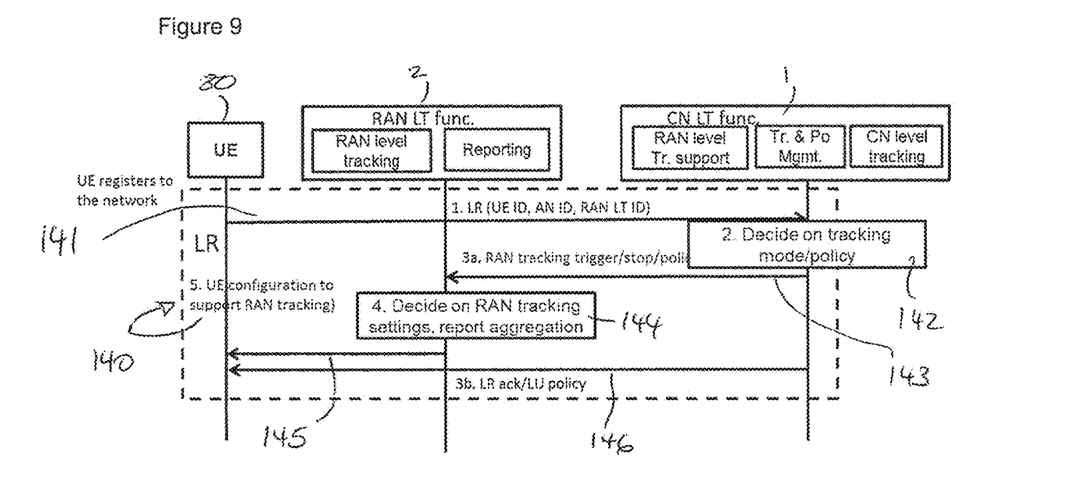
FIG. 9 shows a location registration procedure.
Figure 10:
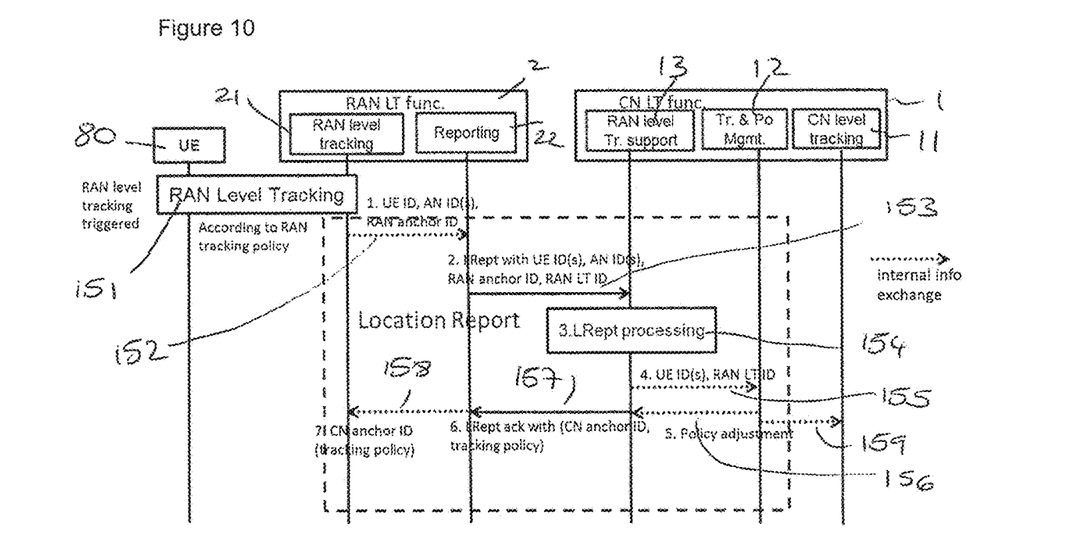
FIG. 10 shows a location reporting procedure.

FIGS. 9 and 10 show examples of detailed signaling procedures implementing the various tracking modes in a system of the type shown in FIG. 2.

FIG. 9 shows a location registration procedure.

When a UE attaches to the network for the first time, location registration (LR) is performed. As part of the LR procedure the CN selects the mode of operation for location tracking.

In step 141 the UE 80 sends a location registration message via the RAN to the CN LT. The message includes the ID of the UE. In forwarding the message the RAN can add the RAN LT ID and the AN ID. In the same or a different message it can indicate the RAN tracking capability of the RAN to the CN.

As discussed above, the CN LT function retrieves the previously stored profiles of the UE and the RAN (unless that has been sent contemporaneously). The tracking mode and policy management unit 12 selects the location tracking mode of operation and the policy for CN/RAN-level tracking based on the RAN's and/or the CN's tracking capability, the UE profile and so on. (Step 142).

If RAN-level tracking is to be used, the CN LT triggers RAN-level tracking and sets the RAN tracking policy at the RAN LT. (Step 143).

If RAN-level tracking is to be used the RAN LT may decide on settings for implementing that. (Step 144). Those settings may include information on whether and how location tracking information for multiple UEs is to be combined into common reports.

If RAN-level tracking is to be used, the RAN may configure the UE to support RAN-level tracking. The details of this depend on the capabilities of the UE and the RAN and the mechanism the RAN is to use to track the UE. (Step 140). The RAN may signal the UE with configuration as indicated at step 145.

Finally, the CN LT sends the policy settings, for example on LR acknowledgement and LU implementation (e.g. a time out for LU and TAI) to the UE via the RAN. (Step 146).

The location update (LU) procedure can be similar to the location registration procedure. In the LU procedure step 143 can also carry a signal to stop RAN level tracking. The CN LT 1 could use this procedure to control RAN-level tracking in the RAN and/or the LU policy of the UE.

FIG. 10 shows a procedure for location reporting. In FIG. 10 dotted lines indicate signaling internal to the RAN or the CN. This signaling could be between different physical units or functions or could happen inherently as a single entity performs multiple functions.

RAN-level tracking is being performed as indicated at 151.

When the RAN anchor changes or the RAN LT function changes or according to the tracking policy set by the CN LT function, the RAN level tracking function 21 sends the UE location and the ID of the RAN anchor to the reporting function 22 at step 152.

The reporting function aggregates received information. It adds the ID of the RAN LT to the received data and sends a location report 152 to module 13. This includes the IDs of the UE, the AN, the RAN anchor and the RAN LT function. There could be multiple ones of each ID in a single message. A field could be used to indicate that the RAN has lost track of the UE. This may be a dedicated field. Alternatively, a null or invalid value in one or both of the AN ID and RAN anchor ID fields could indicate this state.

At step 154, the module 13 processes the received information. Step 154 may involve one or more of: (i) de-aggregating the location report if it includes data on multiple UEs, (ii) converting the UE location from a RAN LT into a set format which is understandable by the CN, (iii) combining UE location data from the RAN and the CN when operating in RANPLT mode, and (iv) combining UE locations determined from different RANs. The latter function may be appropriate when the CN is receiving data on a UE that is operating in multiple RANs or RAN clusters having overlapping tracking areas.

At step 155, the module 13 transmits the UE ID(s) and the RAN LT ID to module 12.

At step 156, the module 12 may, if changes are needed to the policy, signal to module 13 that the policy is to be changed.

At step 157, the module 13 acknowledges message 153. The acknowledgement message, or another message, may convey any required policy changes and/or signal that RAN-level tracking is to be stopped.

At step 158, any policy changes and/or stop signal for RAN-level tracking is conveyed to the module 21.

In practice, the same RAN anchor can be used for multiple UEs, or each UE could have its own RAN anchor. In the former case, message 153 can be used to convey location information for multiple UEs. This can reduce the control signaling needed to support UE location tracking. Accordingly, the processing load at the CN LT can be reduced. The aggregation of location information from multiple UEs into one reporting message can be done at the reporting module 22. If UEs share a RAN anchor then in the reporting message information on those UEs can be grouped together to reduce bandwidth.

When information on multiple UEs is conveyed in a single message 153 there may be a time lag between the information being gathered and it being reported to the CN. The RAN tracking policy may set a maximum time between gathering location data and reporting it to the CN. If the time is reached for a particular UE without its location data having been sent to the CN the RAN may discard location information for that UE or initiate a report promptly. The maximum time may be set for a specific UE type or for all UEs of that RAN.

In implementing the mechanism described above in a 4G-like network, the LR/LU procedure can be implemented by a procedure similar to the 4G NAS procedure in EPC. Some extensions in S1AP and RRC may be advantageous. They include:
1. Extending S1AP on the "report control" message to carry the trigger/stop signal and policy of RAN-level tracking in the LR/LU acknowledgement 157 to the RAN LT.
2. Extending S1AP on the "location report" message to indicate whether RAN-level tracking is possible for a UE.
3. Extending RRC extension to configure the UE for RAN-level tracking.
4. Having a non-UE associated "RAN tracking capability report" message to inform a CN about an applicable RAN tracking area or its accuracy. The area may be indicated by a list of cell or local network IDs. The accuracy may for example be at the cell level or the tracking area level.

To help implement the RAN location report procedure the S1AP "location report" can be extended, e.g. to include the AN ID and RAN anchor ID information elements (IE). The RAN anchor ID can, for instance, be represented by a routable IP address from the CN. Alternatively, an additional non-UE associated "RAN location report" can provide the IEs of UE IDs, TAI(s), AN(s) and/or RAN anchor ID(s). This could support the aggregate of UE locations from multiple UEs, ANs and RAN anchors.

As indicated above, a RAN tracking area can be defined. A RAN tracking area can cover a subset of a single CN TA (FIG. 10), can map to the same area as a CN TA (FIG. 10) or can overlap multiple CN TAs (FIG. 10). The latter may be referred to as a "super cell" case.

In the "super cell" case, RAN-level tracking inside the "super cell" can be transparent to the CN. A virtual cell ID may be defined for the RAN. If it is defined by the RAN itself then it can be reported to the CN. The CN may then consider the "super cell in a similar way to a normal cell and may include the ID of such a "super cell" in the cell list of one TA. In the "super cell" case, the RAN tracking area is independent to the TA. The RAN tracking area could cover several cells and thus not be aligned with the TA defined at the CN. For instance, the CN could be a cellular network and the RAN tracking area could correspond to the coverage area of a Wi-Fi network overlapping the cellular network.

The CN LT can integrate RAN-level tracking into known CN-level location tracking mechanisms. When a UE crosses the boundary of a TA, it sends a location update to the CN LT. If the CN LT identifies that RAN-level tracking is appropriate in the new TA the UE is in, it can trigger RAN-level tracking for this UE and adjust the UE's LU policy, for example by changing the TA list at UE). When the UE moves out of this RAN tracking area, CN-level tracking can be started again based on the UE LU policy, for example by the UE sending a location update to the CN LT. The CN LT is able to stop or adjust the RAN tracking and LU policies at the UE. From the UE side, the RAN tracking area is analogous to a TA which can be indicated to the UE using the existing EPC RAN procedure.

The CNLT mode may operate as in current 4G networks. As a result, the system described above can be backwards compatible with current location tracking systems. The CN LT can select CNLT mode when required for compatibility, and otherwise choose between the other modes.

Applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Applicant indicates that aspects of the present disclosure may consist of any such individual feature or combination of features. In view of the foregoing description it will be evident to a person skilled in the art that various modifications may be made within the scope of the disclosure.

What is claimed is:

1. A radio access network apparatus for use in a radio access network, the radio access network apparatus comprising:
   a processor; and
   a non-transitory computer-readable storage medium coupled to the processor and storing programming instructions which, when executed by the processor, cause the apparatus to:
   receive, an instruction, from a location tracking (LT) function apparatus, wherein the instruction indicates the radio access network to track a location of a user equipment device and a method to track the location comprises:
   the location of the user equipment device is to be tracked concurrently by both the radio access network and a core network used for communicating with the user equipment device, or
   the location of the user equipment device is to be tracked by only the radio access network, or
   the location of the user equipment device is to be tracked by the core network used for communicating with the user equipment device via the radio access network.

2. The radio access network apparatus as claimed in claim 1, wherein the programming instructions which, when executed by the processor, cause the apparatus to:
   receive an indication of tracking policy from the LT function apparatus.

3. The radio access network apparatus as claimed in claim 2, wherein the tracking policy corresponding to the radio access network comprises at least one of:

the frequency with which the radio access network is to report the location of the user equipment device to the core network;

location accuracy required in the report of the user equipment device location from the radio access network to the core network;

the format of the report of the user equipment device location from the radio access network to the core network;

the allowed latency until downlink data is delivered to the user equipment device; or the radio access network tracking area where radio access network level tracking should be performed.

4. The radio access network apparatus as claimed in claim 1, wherein the programming instructions which, when executed by the processor, cause the apparatus to:
report the location of the user equipment device to the LT function apparatus.

5. The radio access network apparatus as claimed in claim 1, wherein the programming instructions which, when executed by the processor, cause the apparatus to:
report a location tracking capability of the radio access network to the LT function apparatus.

6. The radio access network apparatus as claimed in claim 5, wherein the location tracking capability comprises: at least one of tracking area or tracking accuracy.

7. The radio access network apparatus as claimed in claim 1, wherein the programming instructions which, when executed by the processor, cause the apparatus to:
track the location of the user equipment device base on a characteristic of the user equipment device.

* * * * *